US005404347A

United States Patent [19]

Jeong

[11] Patent Number: 5,404,347

[45] Date of Patent: Apr. 4, 1995

[54] METHOD AND CIRCUIT FOR STORING ERASURE BIT OF A CD-ROM

[75] Inventor: Seong-Hyeon Jeong, Suwon, Rep. of Korea

[73] Assignee: SamSung Electronics Co., Ltd., Kyungki, Rep. of Korea

[21] Appl. No.: 732,142

[22] Filed: Jul. 18, 1991

[30] Foreign Application Priority Data

Aug. 9, 1990 [KR] Rep. of Korea ............... 12210/1990

[51] Int. Cl.[6] ............................................ G11B 27/00

[52] U.S. Cl. ........................................ 369/83; 369/47; 369/54

[58] Field of Search ........................ 369/83, 47, 48, 53, 369/54, 59; 371/2.2, 5.1, 40.1, 40.4, 61

[56] References Cited

U.S. PATENT DOCUMENTS 3,749,849 7/1973 Kolpek et al. ........................ 369/83
4,409,682 10/1983 Mori et al. ............................ 369/83
4,901,318 2/1990 Tomisawa .......................... 371/40.1

*Primary Examiner*—Aristotelis Psitos
*Assistant Examiner*—Nabil Hindi
*Attorney, Agent, or Firm*—Robert E. Bushnell

[57] ABSTRACT

There is disclosed a method for storing erasure data of a CD-ROM comprises the steps of generating the address data for storing substantial data and temporarily latching the erasure bit corresponding to the position of the address data by sub-block counting, generating the erasure address data obtained by adding said address data and an offset value when the sub-block counting reaches the final value, and storing the erasure data in the position of the erasure address data by adding the erasure address data and the erasure bit.

19 Claims, 5 Drawing Sheets

| | 0 | 1 | 2 | 3 | · · · · · · | 41 | 42 |
|---|---|---|---|---|---|---|---|
| 0 | 0000 | 0001 | 0002 | 0003 | · · · · · · | 0041 | 0042 |
| 1 | 0043 | 0044 | 0045 | 0046 | · · · · · · | 0084 | 0085 |
| 2 | 0086 | 0087 | 0088 | 0089 | · · · · · · | 0127 | 0128 |
| 3 | 0129 | 0130 | | | · · · · · · | | 0171 |
| 4 | 0172 | | | | · · · · · · | | 0214 |
| 5 | 0215 | | | | · · · · · · | | 0257 |
| 6 | 0258 | | | | · · · · · · | | |
| 7 | E000 | E001 | E002 | E003 | · · · · · · | E041 | E042 |
| 8 | 0301 | 0302 | | | · · · · · · | | 0343 |
| 9 | | | | | | | |
| · | | | | | | | |
| · | | | | | | | |
| · | | | | | | | |
| 14 | | | | | | | |
| 15 | E100 | E101 | E102 | | · · · · · · | E141 | E142 |
| 16 | | | | | | | |
| · | | | | | | | |
| · | | | | | | | |
| · | | | | | | | |
| 22 | | | | | | | |
| 23 | E200 | E201 | E202 | | · · · · · · | E241 | E242 |
| 24 | | | | | | | |
| · | | | | | | | |
| · | | | | | | | |
| · | | | | | | | |
| 27 | 1032 | 1033 | 1034 | | · · · · · · | 1073 | 1074 |
| 28 | 1075 | 1076 | 1077 | | · · · · · · | 1116 | 1117 |
| 29 | E300 | E301 | E302 | | · · · · · · | E341 | E342 |
| 30 | 1118 | 1119 | 1120 | · · · · | 1143 | | |
| 31 | 1144 | 1145 | 1146 | · · · · | 1159 | | |
| | 0 | 1 | 2 | | 25 | | |

*FIG. 4*

|  | <INTERNAL LATCH> | | |
|---|---|---|---|
| 1 | 0 | 43 | 86 | 129 | 172 | 215 |
| 2 | 1 | 44 | 87 | 130 | 173 | 216 |
| 3 | 2 | 45 | 88 | 131 | 174 | 217 |
| ... | | | |
| 43 | 42 | 85 | 128 | 171 | 214 | 257 |

METHOD AND CIRCUIT FOR STORING ERASURE BIT OF A CD-ROM

BACKGROUND OF THE INVENTION

The present invention relates to a method for storing an erasure bit of a CD-ROM (Compact Disc-Read Only Memory), and more particularly to a method for storing the erasure data generated by a compact disc-digital signal processor (DC-DSP) for error correction into a memory.

Generally, the CD-ROM is widely used for a data storage device of a personal computer, and is capable of storing video data, so that it may be used as a memory device for game softwares. Besides the CD-ROM may be employed interactively (CD-I) so as to reduce external memory devices. Moreover, the CD-ROM is systematically compatible with an audio compact disc (CD), and there may be stored into the audio regions computer data, static images, graphic data, musical sounds, vocal sounds, etc. The CD-ROM has a maximum storage capacity of 540 Mega bytes that may allow mass copyings and distributions. The error correction of the CD-ROM is doubly performed both in a conventional CD and the CD-ROM, and therefore the rate of the error correction becomes high so as to give the bit error rate of about $10^{-12}$ bits/(after correction), so that the CD-ROM enables the data processing of high reliability.

The general operation of a CD-ROM system is described with reference to FIG. 1. The data retrieved from a CD by a optical pickup 2 is converted by an RF amplifier 3 into an RF signal processed by an audio signal processor 5. If the RF signal is identified as an audio signal, it is transferred directly to speakers. However, if the RF signal is a data of the CD-ROM such as computer data, static video data, etc., it is transferred through a CD-ROM signal processor 7 to a host computer 8.

Referring to FIG. 2, the CD-ROM signal-processor 7 firstly stores the data generated from the audio signal processor 5 into an external memory 6, and corrects errors, then transferring the error-corrected data to the host computer 8. Conventionally, the external memory 6 comprises two RAMs, RAM1, and RAM2, respectively to store the data and the erasure bit. Namely, the substantial data and the erasure data generated from the audio signal processor 5, after being processed by the CD-ROM signal processor 7, are respectively stored into the first and second RAMs, RAM1 and RAM2, with corresponding addresses. In this case, since the erasure data has one bit per one byte of the substantial data, the second RAM, RAM2, for the erasure data of the external memory 6 is not fully occupied so as to produce vacant regions, so that the working efficiency of the external memory 6 is decreased with the undesirable increase of the PCB's size.

SUMMARY OF THE INVENTION

The object of the present invention is to provide a circuit for storing erasure bit of a CD-ROM, wherein the erasure data generated by a CD-DSP for the error correction and the substantial data are stored into a single memory, thus increasing the work efficiency of the memory as well as minimizing the system thereof.

According to the present invention, a method for storing erasure data of a CD-ROM comprises the steps of generating the address data for storing substantial data and temporarily latching the erasure bit corresponding to the position of the address data by sub-block counting, generating the erasure address data obtained by adding said address data and an offset value when the sub-block counting reaches the final value, and storing the erasure data in the position of the erasure address data by adding the erasure address data and the erasure bit.

The present invention will now be described with reference to the drawings attached only by way of example.

BRIEF DESCRIPTION OF THE ATTACHED DRAWINGS

FIG. 4 is a memory map according to the present invention; and

DETAILED DESCRIPTION OF THE PREFERRED EMBODIMENT

Figure 1:
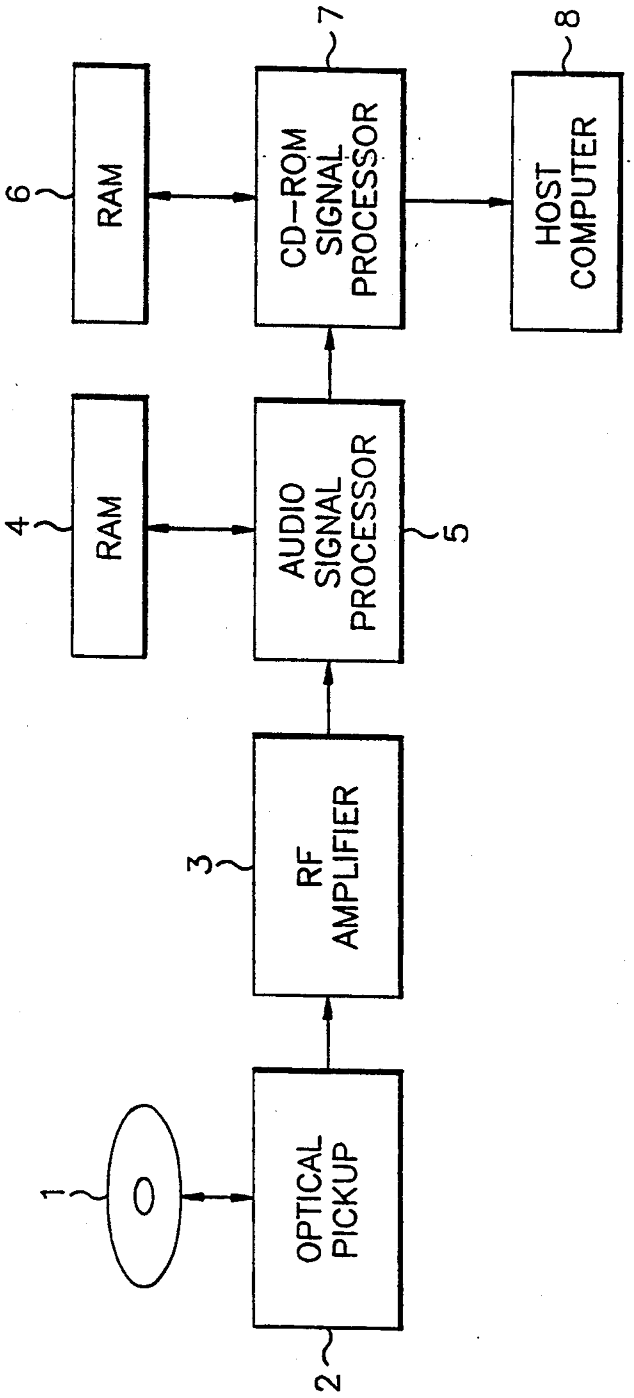
FIG. 1 is a block diagram for illustrating a CD-ROM general system.
Figure 2:
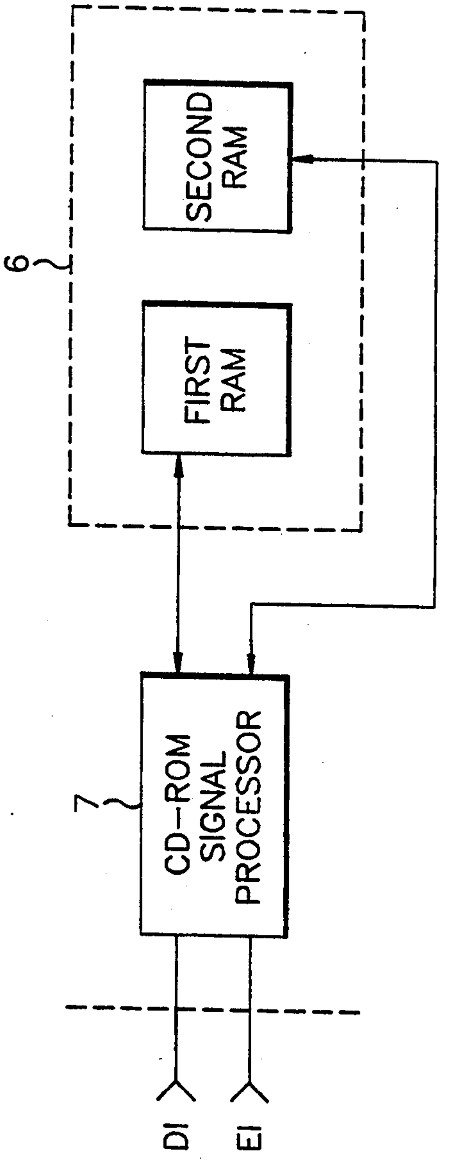
FIG. 2 is a block diagram for illustrating a conventional circuit for processing erasure data.
Figure 3:
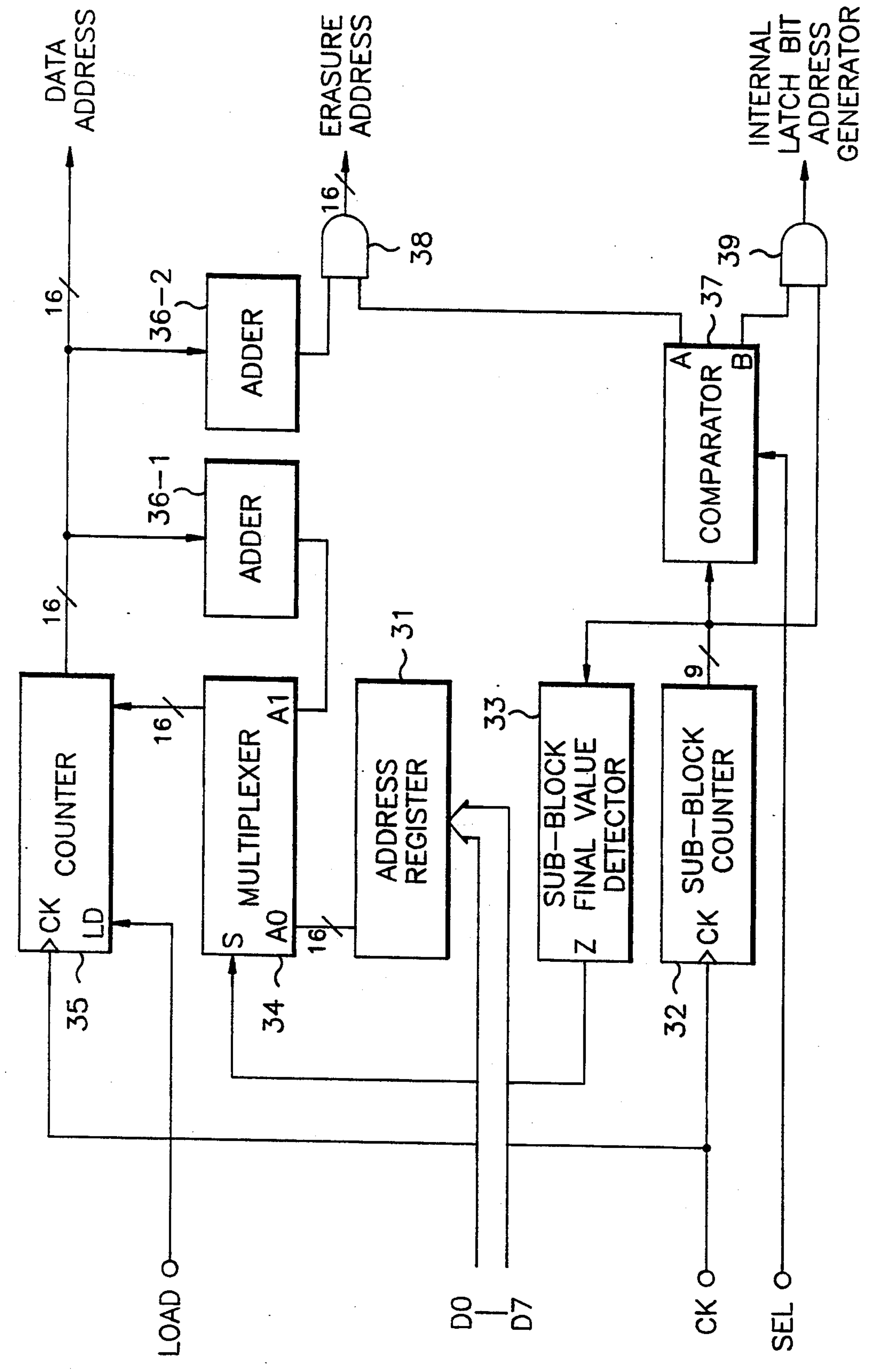
FIG. 3 is a block diagram for illustrating an embodiment of the present invention.

Referring to FIG. 3, an address register 31 is connected with the data bus D0-D7 of an audio signal processor so as to store initial address data. A sub-block counter 32 counts the clock signal CK provided by the audio signal processor 5 in bytes so as to generate the address data for designating a sub-block.

A sub-block final value detector 33 checks whether the output of the sub-block counter 32 reaches the final data value. A multiplexer 34 selects the stored value of the start address register 31 and the value for increasing each line according to the output of the sub-block final value detector 33.

A counter 35 is initialized by a load signal LOAD provided by the timing control of the CD-ROM signal processor 7, and counts the output value of the multiplexer 34 according to the clock signal CK so as to generate address data. An adder 36-1 adds "44" corresponding to the one line data number to the output value of the counter 35, and then provides the output to the multiplexer 34.

A comparator 37 compares the output value of the sub-block counter 32 and the value of the final line of the sub-block in response to a selection signal SEL provided by the timing control of the CD-ROM signal processor 7. A erasure address data generator 38 provides the output of the adder 36-2 as the erasure address data when the output value of the sub-block counter 32 is greater than the value of the final line of the sub-block. The second adder 36-2 adds one line data number to the output value of the counter 35, providing the output to the address data generator 38. An internal latch bit address generator 39 provides the output of the sub-block counter 32 as the internal latch bit address signal when the output value of the sub-block counter 32 is smaller than the value of the final line of the sub-block.

In operation, a microcomputer (not shown) sets the presently input initial address value of a block into the start address register 31. The signal generated by the timing control of the CD-ROM signal processor 7 is input to the load terminal LOAD. The value of the start address register 31 is selected by the multiplexer 34 according to the selection signal S, thus loaded as the initial counting value of the counter 35. The selection signal S of the multiplexer 34 is provided by the output of the sub-block final value detector 33.

Meanwhile, the sub-block final value detector 33 receives the output of the sub-block counter 32 that counts the clock pulses generated whenever the data of the audio signal processor 5 is input to the clock terminal K. When the sub-block counter 32 counts the clock pulses by 300, the output of the sub-block final value detector 33 is changed, and by the changed value selects the multiplexer 34 the other input A1 generated from the first adder 36-1 that is loaded as the initial value of the counter 35.

In the present embodiment, the initial set value of the start address register 31 is set to "0", and therefore the output "0" of the multiplexer 34 is loaded as the initial counting value of the counter 35. Hence, the counter 35 generates the data address signal by counting the clock pulses generated upon the data input of the clock terminal CK. The clock pulses CK continue to be counted by the sub-block counter 32, whose output is delivered to the sub-block final value detector 33, the comparator 37 and the internal latch bit address generator 39 consisting of an AND gate, thus storing the erasure bit into the internal latch as shown in FIG. 5.

The erasure bits are addressed and stored into a total of forty-three latches each with transversely six bits from "0" position to "257" position. Namely, as shown in FIG. 4, the vertical position is "5" and the horizontal position "42". For example, if the counted value of the sub-block counter 32 exceeds "257" in the bit addressing, the output A of the comparator 37 becomes "high". The "high" output A of the comparator 37 is input to the erasure address data generator 38. Meanwhile, the output of the counter 35 is combined with "43" by the second adder 36-2, then logically combined with the output of the comparator 37 through the erasure address data generator 38 to generate the erasure address. Hence, the storing of the substantial, general, data and the erasure bit is accomplished by the data storing address signal produced by the counter 35. When the storing data reaches a given value, the erasure address consists of the total "7" bits including the six bits internally latched by the erasure address generated by the address data generator 38 and one erasure bit input by the audio signal processor 5. The erasure address is generated after inputting "258" bytes from the audio signal processor 5. When the sub-block counter 32 counts "300", the output of the sub-block final value detector 33 is changed so as to cause the multiplexer 34 to select the output of the first adder 36-1 as the initial counting value of the counter 35.

Figure 5:
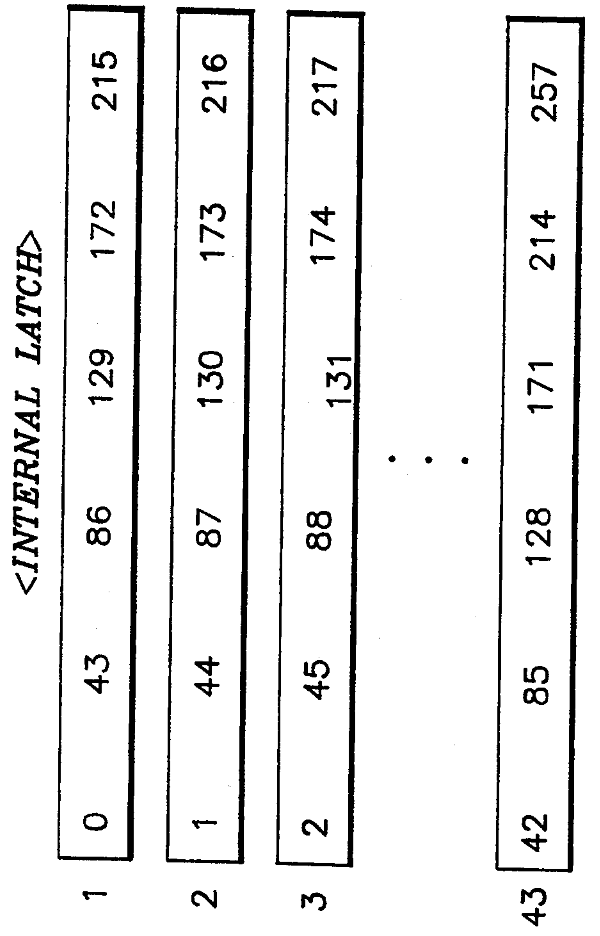
FIG. 5 is a map of internal latch according to the present invention.

As the counter 35 generates the address data, the initially input data is stored in the position "0000" of FIG. 4, and the erasure bit is stored in the position "0" of FIG. 5 according to the address generated by the internal latch bit address generator 39.

Next, the secondly input data is stored in the data address position increased by "1" as shown in FIG. 4, and the erasure bit is stored in the position "1" of the internal latch as shown in FIG. 5. Likewise, when the substantial data is subsequently stored in the memory position "0257", and the erasure bit is stored in the internal latch, the 258th input data is stored in the data address position "0258" as shown in FIG. 4. In addition, the erasure address data generator 38 generates the address, so that the erasure bit is combined with the first six bits of the internal latch as shown in FIG. 5, then stored in the position "E0000" of FIG. 4 that is obtained by the second adder 36-2 adding "43" to the present data address. Thereafter, when all the "43" erasure data of seven rows of the memory map are stored, the output value of the sub-block counter 32 again becomes "0", and the first adder 36-1 adds "44" to the value of the present address data so as to again load the added value in the counter 35.

The same operation is repeated until "1117" data of the audio signal processor 5 are written. The selection signal SEL, when storing data from the "24"th row in FIG. 4, is to store the erasure data in the "29"th row after storing "215" data by the comparator 37 selecting "214" among "257" and "214".

As stated above, the present invention enables the substantial data and the erasure data to be stored into a single memory, thus increasing the working efficiency of the memory as well as reducing the size of the system.

What is claimed is:

1. A method for storing erasure data and general data in a single memory, said method comprising the steps of:

- temporarily storing initial addresses;
- counting clock signals in bytes so as to generate sub-block addresses for designating sub-blocks within said single memory;
- generating sub-block final value signals when said sub-block addresses reach a final data value;
- providing one of the stored initial addresses and first adder addresses as counter initialization values according to said sub-block final value signals;
- successively incrementing said counter initialization values according to said clock signals to generate data addresses for enabling said general data to be written into said single memory;
- adding a one line value corresponding to a one line data number to said data addresses to generate said first adder addresses;
- adding an offset value of one line data number to said data addresses to generate second adder addresses;
- comparing said sub-block addresses to a final line of said sub-blocks in response to selection signals;
- providing said second adder addresses as erasure addresses for enabling said erasure data to be written into said single memory when said sub-block addresses are greater than said final line of said sub-blocks; and
- providing said sub-block addresses as an internal latch bit address for temporarily storing said erasure data into an internal latch when said sub-block addresses are smaller than said final line of said sub-blocks, whereby said erasure data latched from said internal latch and said general data are alternatively written into said single memory.

2. The method for storing erasure data as claimed in claim 1, wherein said erasure addresses are provided by adding address values of said data addresses of a seventh line of every sub-block to said offset value of one line so as to write said latched erasure data in one line.

3. The method for storing erasure data as claimed in claim 1, wherein said general data and said erasure data are each written in alternate blocks of said single memory.

4. A circuit for storing erasure bits from a data storage device, said circuit comprising:
memory means for storing data;
address register means for storing initial addresses;
sub-block counter means for counting clock signals in bytes so as to generate sub-block addresses for designating sub-blocks;
sub-block final value detector means for generating sub-block final value signals in response to whether said sub-block addresses generated by said sub-block counter means reaches a final data value;
multiplexer means for providing one of the stored initial addresses of said address register means and first adder addresses as counter initialization values according to said sub-block final value signals;
counter means for loading said counter initialization values in response to load signals and successively incrementing said counter initialization values according to said clock signals so as to generate memory addresses;
first adder means for adding a one line value corresponding to a one line data number to said memory addresses so as to generate said first adder addresses;
second adder means for adding an offset value of one line data number to said memory addresses to generate second adder addresses;
comparator means for comparing said sub-block addresses of said sub-block counter means to a final line of said sub-blocks in response to selection signals;
erasure address data generator means for providing said second adder addresses as erasure addresses when said sub-block addresses are greater than said final line of said sub-blocks; and
internal latch bit address generator means for providing said sub-block addresses as an internal latch bit addresses when said sub-block addresses are smaller than said final line of the sub-block.

5. The circuit as claimed in claim 4, wherein said erasure data generator means and said internal latch bit address generator means are each comprised of a different AND gate.

6. The circuit as claimed in claim 4, wherein said internal latch bit address generator means provides said internal latch bit addresses for latching said erasure bits into an internal latch so as to enable said general data and said erasure data to be written in alternate blocks of said single memory.

7. The circuit as claimed in claim 4, wherein said data storage device is an optical storage device.

8. The circuit as claimed in claim 4, wherein said data storage device is a compact disk read-only-memory.

9. The circuit as claimed in claim 1, wherein said data storage device is an optical storage device.

10. The circuit as claimed in claim 1, wherein said data storage device is a compact disk read-only-memory.

11. The circuit as claimed in claim 8, further comprising:
audio signal processor means for generating said clock signals and processing radio frequency data signals generated by said data storage device so as to generate said initial addresses and data; and
CD-ROM signal processor means for receiving said data and generating said load signals and said selection signals.

12. The circuit as claimed in claim 11, wherein audio signal processor means selectively provides said data generated by said data storage device to speakers if said data represents an audio signal.

13. The circuit as claimed in claim 4, wherein said one line value is "44".

14. The circuit as claimed in claim 4, wherein said offset value is "43".

15. A circuit for storing erasure data and general data in a single memory, comprising:
address register means for storing initial addresses to access to said single memory;
sub-block means for counting clock signals in bytes so as to generate sub-block addresses for designating sub-blocks within said single memory, and generating sub-block final value signals when said sub-block addresses reach a final data value;
multiplexer means for providing one of the stored initial addresses of said address register means and first adder addresses as counter initialization values according to said sub-block final value signals;
counter means for successively incrementing said counter initialization values according to said clock signals to generate data addresses for enabling said general data to be written into said single memory;
adder means for adding a one line value corresponding to a one line data number to said data addresses so as to generate said first adder addresses, and for adding an offset value of one line data number to said data addresses to generate second adder addresses;
comparator means for comparing said sub-block addresses to a final line of said sub-blocks in response to selection signals; and
erasure address data generator means for providing said second adder addresses as erasure addresses for enabling said erasure data to be written into said single memory when said sub-block addresses are greater than said final line of said sub-blocks.

16. The circuit as claimed in claim 15, further comprising internal latch bit address generator means for providing said sub-block addresses as an internal latch bit address when said sub-block addresses are smaller than said final line of the sub-block, said internal latch bit address addressing said erasure data in an internal latch so as to enable said erasure data and said general data to be alternatively written into said single memory.

17. The circuit as claimed in claim 15, wherein said erasure data generator means and said internal latch bit address generator means are each comprised of a different logic AND gates.

18. A circuit for storing erasure data and general data in a single memory having a plurality of blocks, comprising:
address register means for storing initial addresses;
sub-block counter means responsive to input general data, for counting clock signals in bytes so as to generate sub-block addresses for designating sub-blocks within said single memory;
sub-block final value detector means for generating sub-block final value signals when said sub-block addresses reach a final data value;
multiplexer means for providing one of the stored initial addresses of said address register means and first adder addresses as counter initialization values according to said sub-block final value signals;
counter means for counting said counter initialization values according to said clock signals to generate data addresses, said counter means being initialized by load signals;

first adder means for adding a first value corresponding to a one line data number to said data addresses so as to generate said first adder addresses;

second adder means for adding an offset value of said one line data number to said data addresses to generate second adder addresses;

comparator means for comparing said sub-block addresses to a final line of said sub-blocks in response to selection signals;

erasure address data generator means for providing said second adder addresses as erasure addresses when said sub-block addresses are greater than said final line of said sub-blocks; and internal latch bit address generator means for providing said sub-block addresses as internal latch bit addresses when said sub-block addresses are smaller than said final line of the sub-block, said internal latch bit addresses temporarily storing said erasure data in an internal latch so as to enable said erasure data and said general data to be written into each block of said single memory in accordance with said data addresses and said erasure addresses.

19. The circuit as claimed in claim 18, wherein said erasure data generator means and said internal latch bit address generator means are each comprised of a different logic AND gates.

* * * * *